(12) United States Patent
Snowdon

(10) Patent No.: US 8,456,225 B1
(45) Date of Patent: Jun. 4, 2013

(54) NEGATIVE CHARGE PUMP

(75) Inventor: Kenneth P. Snowdon, Falmouth, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/338,198

(22) Filed: Dec. 27, 2011

(51) Int. Cl.
*G05F 1/10* (2006.01)

(52) U.S. Cl.
USPC .............................. 327/536; 363/60

(58) Field of Classification Search
USPC ............................ 327/536; 363/60
See application file for complete search history.

(56) References Cited

U.S. PATENT DOCUMENTS

| | | | | |
|---|---|---|---|---|
| 4,922,403 A * | 5/1990 | Feller | ............... | 363/60 |
| 5,767,733 A * | 6/1998 | Grugett | ............... | 327/534 |
| 5,874,850 A * | 2/1999 | Pulvirenti et al. | ............ | 327/536 |
| 6,130,572 A * | 10/2000 | Ghilardelli et al. | ............ | 327/536 |
| 6,448,842 B2 * | 9/2002 | Zanuccoli et al. | ............ | 327/536 |
| 6,657,478 B2 * | 12/2003 | Matsumoto | ............... | 327/536 |
| 6,819,162 B2 * | 11/2004 | Pelliconi | ............... | 327/536 |
| 6,992,522 B2 * | 1/2006 | Ido | ............... | 327/536 |
| 7,466,190 B2 * | 12/2008 | Lall et al. | ............... | 327/537 |
| 7,477,093 B2 * | 1/2009 | Al-Shamma et al. | ............ | 327/536 |
| 7,521,983 B2 * | 4/2009 | Ragone et al. | ............... | 327/427 |
| 7,545,685 B2 * | 6/2009 | Lee | ............... | 365/189.11 |
| 7,808,303 B2 * | 10/2010 | Yamahira | ............... | 327/536 |

* cited by examiner

*Primary Examiner* — Thomas J Hiltunen
(74) *Attorney, Agent, or Firm* — Grossman Tucker Perreault & Pfleger PLLC

(57) ABSTRACT

Generally, this disclosure provides negative charge pump circuitry that is configured to supply a voltage that is less than a reference voltage (such as ground). The charge pump circuitry includes blocking circuitry that reduces or eliminates charge leakage so that a negative voltage may be developed at the output. The charge pump circuitry generally includes complimentary pairs of MOS switches that switch in a complimentary fashion according to charge developed on complimentary capacitors to provide a negative voltage power supply.

20 Claims, 3 Drawing Sheets

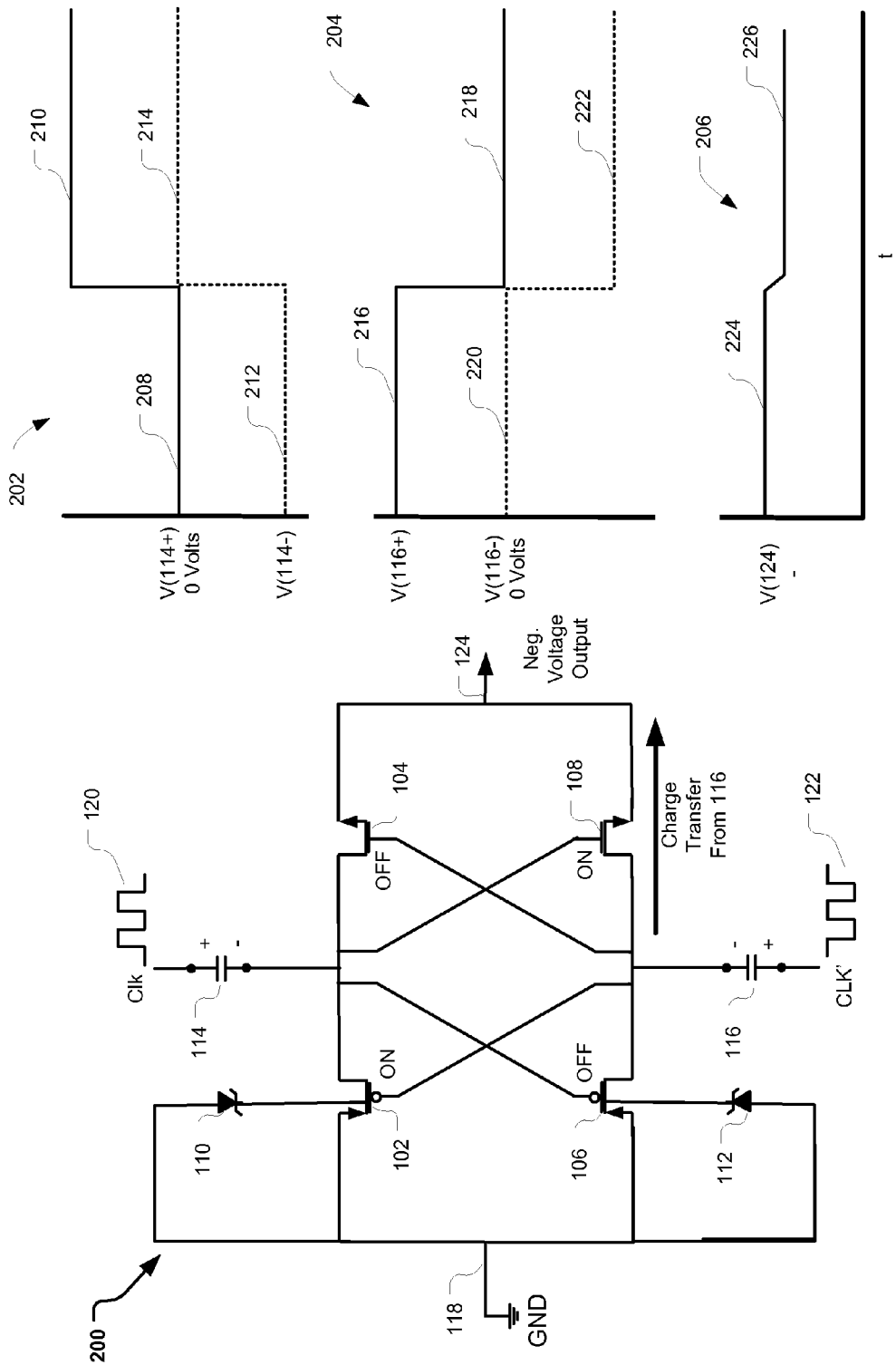

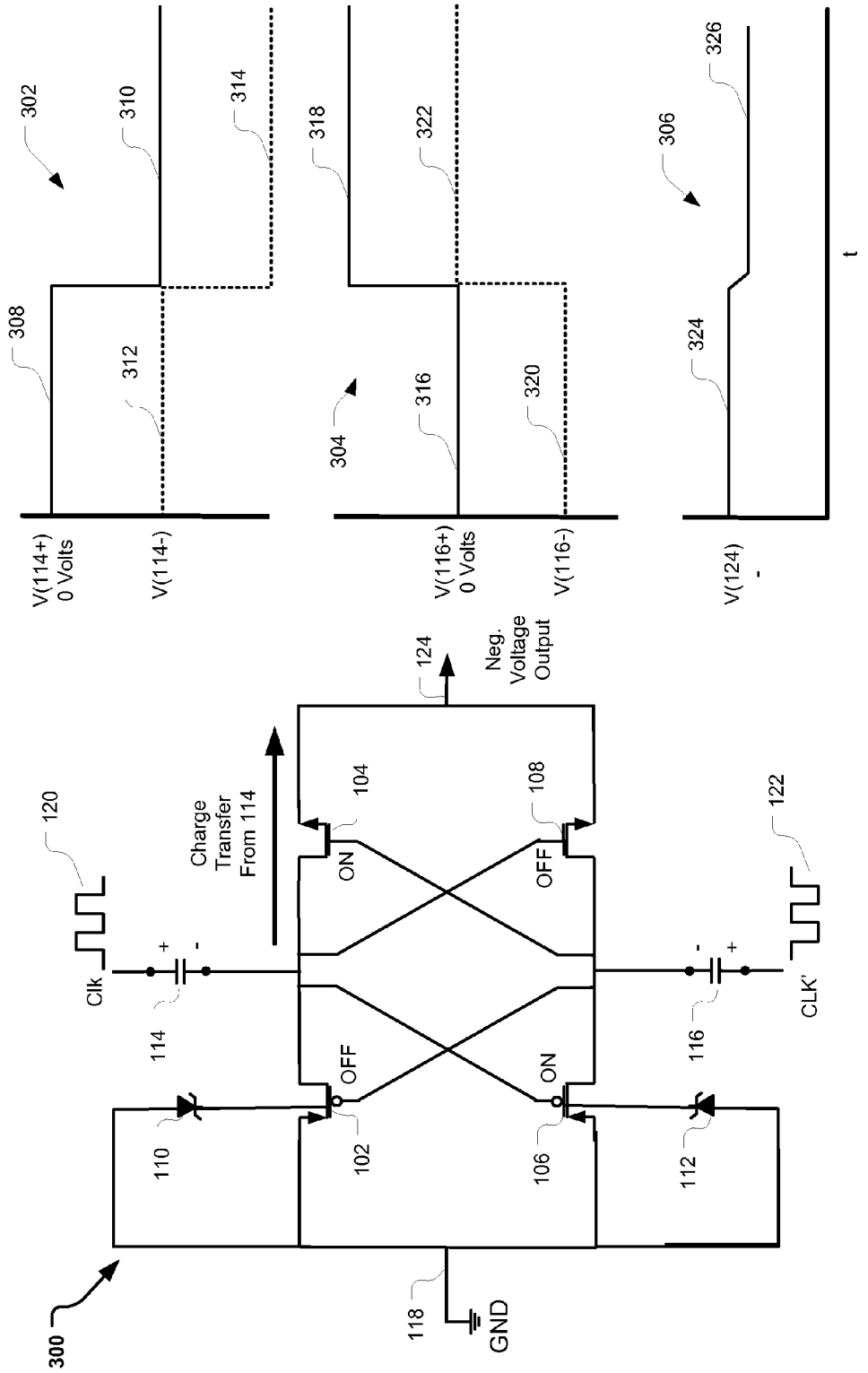

NEGATIVE CHARGE PUMP

FIELD

The present disclosure relates to a negative charge pump.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 2A illustrates the negative charge pump circuitry of FIG. 1 during one operational phase;

FIG. 2B illustrates various timing signals of the operation of the charge pump circuitry of FIG. 2A;

FIG. 3A illustrates the negative charge pump circuitry of FIG. 1 during another operational phase; and FIG. 3B illustrates various timing signals of the operation of the charge pump circuitry of FIG. 3A.

Figure 1:
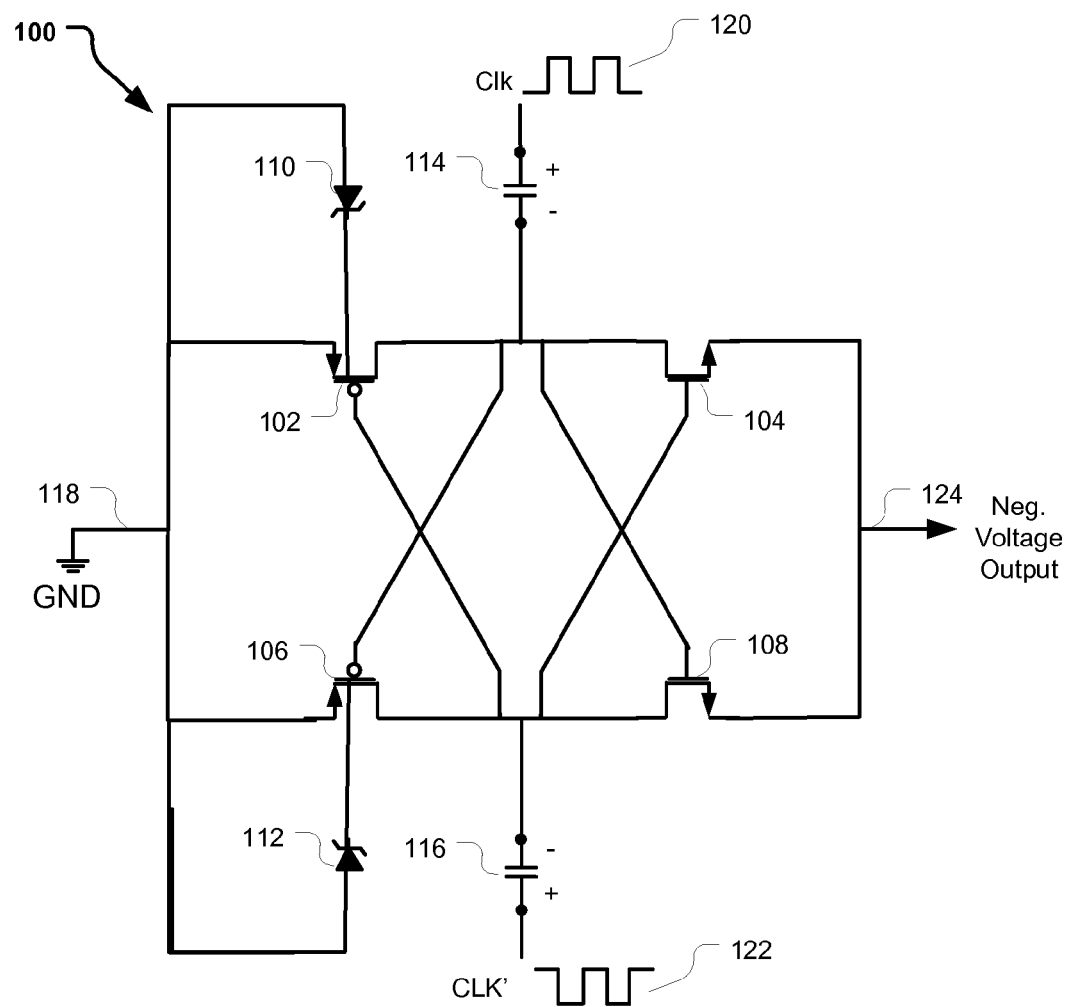
FIG. 1 illustrates negative charge pump circuitry consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides negative charge pump circuitry that is configured to supply a voltage that is less than a reference voltage (such as ground). The charge pump circuitry includes blocking circuitry that reduces or eliminates charge leakage so that a negative voltage may be developed at the output. The charge pump circuitry generally includes complimentary pairs of MOS switches that switch in a complimentary fashion according to charge developed on complimentary capacitors to provide a negative voltage power supply. Advantageously, the negative power supply may be used to power a variety of devices that require a negative voltage to operate.

FIG. 1 illustrates negative charge pump circuitry 100 consistent with various embodiments of the present disclosure. In some embodiments, the negative charge pump circuitry 100 depicted in FIG. 1 may be included with, or form part of, a general-purpose or custom integrated circuit (IC) such as a semiconductor integrated circuit chip, system on chip (SoC), etc. In other embodiments, the negative charge pump circuitry 100 may be a stand-alone module formed of integrated and/or discrete circuit elements. As a general overview, the negative charge pump circuitry 100 may be configured to operate as a negative voltage amplifier where the output of the amplifier adds the amplitude of the clock input signals 120 and 122 to the voltage at the source of switches 102 and 106.The negative charge pump circuitry 100 is configured to generate a negative output voltage rail 124 that may be used as a negative power supply for a variety of other circuits, systems, components and/or modules.

The negative charge pump circuitry 100 includes first PMOS/NMOS switch pair 102 and 104, second PMOS/NMOS switch pair 106 and 108, first and second capacitors 114 and 116, and first and second blocking circuits 110 and 112. The PMOS switches 102 and 106 may each comprise isolated transistor devices to reduce or eliminate charge leakage to the P-substrate. Generally, an "isolated" device means that the drain/bulk and source/bulk junction diodes of the device are isolated, physically and electrically, from the containing substrate. For example, in an isolated device may include an additional n-type diffusion to p-type substrate junction diode with a large breakdown characteristic voltage. The drains of the PMOS switch 102 and the NMOS switch 104 are coupled together at the negative node of capacitor 114. The gates of the PMOS switch 102 and the NMOS switch 104 are coupled to the negative node of capacitor 116. Thus, the voltage state of capacitor 116, as well as the relative gate-source voltage of each of the switches, controls the conduction states of switches 102 and 104. Similarly, the drains of the PMOS switch 106 and the NMOS switch 108 are coupled together at the negative node of capacitor 116. The gates of the PMOS switch 106 and the NMOS switch 108 are coupled to the negative node of capacitor 114. Thus, the voltage state of capacitor 114, as well as the relative gate-source voltage of each of the switches, controls the conduction states of switches 106 and 108. The source of switches 102 and 106 are coupled to GND 118, and the source of switches 104 and 108 are coupled to the output voltage rail 124.

Blocking circuitry 110 is coupled to the N-well of isolated PMOS switch 102 and forward biases with respect to ground 118 (GND), or other reference potential. The blocking circuitry 110 is configured to block charge transfer from capacitor 114 to GND 118 when PMOS switch 102 is OFF. Similarly, blocking circuitry 112 is coupled to the N-well of isolated PMOS switch 106 and forward bias with respect to ground 118 (GND), or other reference potential. The blocking circuitry 112 is configured to block charge transfer from capacitor 116 to GND 118 when PMOS switch 106 is OFF. While the blocking circuitry 110 and 112 is depicted as a Schottky diode in FIG. 1, those skilled in the art will recognize that the blocking circuitry 110 and 112 may each include, for example, NMOS transistors, diodes, and/or other circuitry that may be used to prevent charge from leaking through an OFF transistor.

The PMOS switches 102 and 106 are configured to switch ON and OFF in an alternating, out-of-phase fashion with NMOS switches 104 and 108, respectively. Clock signal 120 (CLK) is coupled to the positive node (+) of capacitor 114 and complimentary clock signal 122 (CLK') is coupled to the positive node (−) of capacitor 116. Clock signals 120 and 122 are generally configured to be the inverse of one another, and are signals that transition Low to High and High to Low in an alternating fashion. "Low" and "High", as used herein, denote relative potential states for the clock signals 120 and 122, for example, in one embodiment, the Low potential is at ground or 0 Volts, and the High potential is at 3 Volts. The negative node (−) of capacitor 114 is coupled to the negative voltage output 124 through NMOS switch 104 and to GND 118 through switch 102. Similarly, the negative node (−) of capacitor 116 is coupled to the negative voltage output 124 through NMOS switch 108 and to GND 118 through switch 106. The alternating, out-of-phase operation of the switches 102, 104, 106 and 108 charge capacitors 114 and 116, and provide transfer of negative voltage to the output 124, as will be described in detail below.

FIG. 2A illustrates the negative charge pump circuitry of FIG. 1 during one operational phase and FIG. 2B illustrates various timing signals of the operation of the charge pump circuitry of FIG. 2A. Describing FIGS. 2A and 2B together, this operational phase depicts the transitional phase when CLK 120 transitions from Low to High and CLK' 122 transitions from High to Low. In this example, the clock signal 120 transitions between 0 Volts (Low) and a nominal or maximum voltage (High). Waveforms 202 represent the voltages across capacitor 114 during the transition of CLK 120 from Low to High. Signal V(114+) represents the voltage on the positive node of capacitor 114, and this signal transitions from approximately 0 Volts (208) to the nominal voltage of the clock signal 120 (210). Signal V(114−) represents the voltage on the negative node of capacitor 114, and this signal transitions from a negative voltage (212) to approximately 0 Volts (214). The negative voltage 212 is representative of the negative charge that is on the capacitor before the transition of CLK 120 from Low to High.

Waveforms 204 represent the voltages across capacitor 116 during the transition of CLK' 122 from High to Low. Signal V(116+) represents the voltage on the positive node of capacitor 116, and this signal transitions from approximately the nominal voltage (216) to approximately 0 Volts (218). Signal V(116−) represents the voltage on the negative node of capacitor 116, and this signal transitions from approximately 0 Volts (220) to a negative voltage (222). The negative voltage 222 is representative of the negative charge that is on the capacitor 216 after the transition of CLK' 122 from High to Low. The magnitude of the negative voltages at period 212 and 222 are based on the amount of charge that has been delivered to node V(124). Since the voltage across the capacitor V=Q/C is dependent on the size of the capacitor and the charge, if the capacitor delivers most of its charge to node (V124) then a lower voltage will result across capacitor 116. If node V(124) has been driven to a potential equivalent to the clock swing below node 118, then very little charge will be delivered and the voltages V212, and V222 will be approximately the same as the swing of the clk(122). Waveform 206 represents the negative output voltage (V(124−)) both before (224) and after (226) the transition of the clock signals 120 and 122 The change in the potential at V(124) may be dependent on the swing of CLK 120 and 122, and the amount of charge transferred to node 124 from capacitors 116 and 114. For example, if node 124 has little capacitance associated with it, capacitors 116 and 114 will charge share with the capacitance on node 124 and the voltage on node 124 will change rapidly to a final value which is the magnitude of the clocks swing at 120/122. If there is a significant capacitance on node 124, the capacitors 114 and 116 will charge share with the much larger capacitor on node 124 and will take a much longer time to change to the final value which will be the magnitude of the swing on clocks 120/122.

After the transition of CLK 120 from Low to High (and after the transition of CLK' 122 from High to Low), voltage V(114−) is at approximately 0 Volts (214) and voltage V(116−) is a negative voltage. The conduction states of the switches 102, 104, 106 and 108 after the transition of clocks 120 and 122 are depicted in FIG. 2A. The negative node of capacitor 116 turns switch 102 ON since the voltage level (222) at this node is lower (more negative) than the $V_{GS}$ potential needed to keep switch 102 OFF (e.g., approximately −0.8 Volts), and turns switch 104 OFF. The negative node of capacitor 114 turns switch 106 OFF since this voltage level (214) is at approximately 0 Volts, and turns on switch 108. Since switch 102 is ON, the negative node of capacitor 114 is connected to GND 118 through switch 102. Under this condition, the capacitor114 will have a low impedance on both the positive (+) and negative (−) nodes and will be charged to its maximum voltage across it, and thus maximum charge. In contrast, the blocking circuitry 112 prevents the negative charge at the negative node of capacitor 116 from flowing through switch 106 to GND 118, and thus, the charge at the negative node of capacitor 116 transfers to the output 124 through switch 108 (as shown by the bold arrow), and a negative potential develops at the output 124.

FIG. 3A illustrates the negative charge pump circuitry of FIG. 1 during another operational phase and FIG. 3B illustrates various timing signals of the operation of the charge pump circuitry of FIG. 3A. Describing FIGS. 3A and 3B together, this operational phase depicts the transitional phase when CLK 120 transitions from High to Low and CLK' 122 transitions from Low to High. In this example, the clock signal 120 transitions between 0 Volts (Low) and a nominal or maximum voltage (High). Waveforms 302 represent the voltages across capacitor 114 during the transition of CLK 120 from High to Low. Signal V(114+) represents the voltage on the positive node of capacitor 114, and this signal transitions the nominal voltage of the clock signal (308) to approximately 0 Volts (310). Signal V(114−) represents the voltage on the negative node of capacitor 114, and this signal transitions from approximately 0 Volts (312) to a negative voltage (314). The negative voltage 314 is representative of the negative charge that is on the capacitor after the transition of CLK 120 from High to Low.

Waveforms 304 represents the voltages across capacitor 116 during the transition of CLK' 122 from Low to High. Signal V(116+) represents the voltage on the positive node of capacitor 116, and this signal transitions from approximately 0 Volts (316) to the nominal voltage (318). Signal V(116−) represents the voltage on the negative node of capacitor 116, and this signal transitions from a negative voltage (320) to approximately 0 Volts (322). The negative voltage 202 is representative of the negative charge that is on the capacitor 216 after the transition of CLK' 122 from High to Low. The magnitude of the negative voltages at period 312 and 320 are based on on the amount of charge that has been delivered to node V(124). Since the voltage across the capacitor V=Q/C is dependent on the size of the capacitor and the charge, if the capacitor delivers most of its charge to node (V124) then a lower voltage will result across capacitor 116. If node V(124) has been driven to a potential equivalent to the clock swing below node 118, then very little charge will be delivered/shared and the voltages V212, and V222 will be approximately the same as the swing of the clk(122). Waveform 306 represents the negative output voltage (V(124−)) both before (324) and after (326) the transition of the clock signals 120 and 122.

After the transition of CLK 120 from High to Low (and after the transition of CLK' 122 from Low to High), voltage V(114−) is a negative voltage (314) and voltage V(116−) is approximately 0 Volts (322). The conduction states of the switches 102, 104, 106 and 108 after the transition of clocks 120 and 122 are depicted in FIG. 3A. The negative node of capacitor 114 turns switch 106 ON since the voltage level (314) at this node is lower (more negative) than the $V_{GS}$ potential needed to keep switch 106 OFF (e.g., approximately −0.8 Volts), and turns switch 108 OFF. The negative node of capacitor 116 turns switch 102 OFF since this voltage level (322) is at approximately 0 Volts, and turns ON switch 104. Since switch 106 is ON, the negative node of capacitor 116 is connected to GND118 through switch 106. In contrast, the blocking circuitry 110 prevents the negative charge at the negative node of capacitor 114 from flowing through switch 102 to GND 118, and thus, the charge at the negative node of capacitor 114 transfers to the output 124 through switch 104 (as shown by the bold arrow), and a negative potential develops at the output 124.

While FIGS. 1, 2A and 3A exemplary circuit topologies that may be utilized according to the teachings of the present disclosure, it will be recognized that many alternatives and/or modifications may be apparent to those skilled in the art, and all such alternatives and/or modifications that satisfy the above-described functionality and/or purpose are deemed within the scope of the present disclosure. In addition, "circuitry" or "circuit", as used in any embodiment herein, may comprise, for example, singly or in any combination, hard-wired circuitry, programmable circuitry, state machine circuitry, and/or circuitry available in a larger system, for example, discrete elements that may be included as part of an integrated circuit. In addition, while the switch devices (e.g., switch 102, 104, 106, 108) are described herein as metal-oxide semiconductor (MOS) devices, any of these switches may include any type of known or after-developed switch circuitry such as, for example, bipolar junction transistor (BJT), silicon carbide transistor (SiC), insulated gate bipolar transistor (IGBT), and/or any other switch circuitry that may be configured to controllably change conduction states, etc. Modifications may be made to the foregoing embodiments. For example, multiple negative charge pump circuits may be cascaded together to increase the negative voltage output. In such a case, the input to each stage of the cascade may be the negative voltage output of the previous stage, instead of being coupled to GND or a reference potential.

Accordingly, in one embodiment the present disclosure provides a negative charge pump circuit that includes a first PMOS/NMOS switch pair coupled between a negative voltage output and a reference potential and a second PMOS/NMOS switch pair coupled between the negative voltage output and a reference potential. The negative charge pump circuit also includes a first capacitor having a positive node coupled to a first clock signal configured to charge the first capacitor and negative node coupled to the first PMOS/NMOS switch pair and to the second PMOS/NMOS switch pair and configured to control the conduction state of the second PMOS/NMOS switch pair; and a second capacitor having a positive node coupled to a second clock signal configured to charge the second capacitor and negative node coupled to the second PMOS/NOS switch pair and to the first PMOS/NMOS switch pair and configured to control the conduction state of the first PMOS/NMOS switch pair. The negative charge pump circuit further includes first blocking circuitry coupled to the PMOS switch of the first PMOS/NMOS switch pair and to the reference potential, the first blocking circuitry is configured to prevent a charge at said negative node of said first capacitor from leaking to the reference potential through the PMOS switch of the first PMOS/NMOS switch pair; and second blocking circuitry coupled to the PMOS switch of the second PMOS/NMOS switch pair and to the reference potential, the second blocking circuitry is configured to prevent a charge at said negative node of said second capacitor from leaking to the reference potential through the PMOS switch of the second PMOS/NMOS switch pair.

In another embodiment, the present disclosure provides a negative charge pump circuit that includes a first PMOS/NMOS switch pair coupled between a negative voltage output and a reference potential and a second PMOS/NMOS switch pair coupled between the negative voltage output and a reference potential. The negative charge pump circuit also includes first blocking circuitry coupled to the PMOS switch of the first PMOS/NMOS switch pair and to the reference potential, the first blocking circuitry is configured to prevent a charge between the PMOS switch and the NMOS switch of the first PMOS/NMOS switch pair from leaking to the reference potential through the PMOS switch of the first PMOS/NMOS switch pair; and second blocking circuitry coupled to the PMOS switch of the second PMOS/NMOS switch pair and to the reference potential, the second blocking circuitry is configured to prevent a charge between the PMOS switch and the NMOS switch of the second PMOS/NMOS switch pair from leaking to the reference potential through the PMOS switch of the second PMOS/NMOS switch pair.

In still another embodiment, the present disclosure provides a method that includes coupling a first PMOS/NMOS switch pair between a negative voltage output and a reference potential. The method also includes coupling a second PMOS/NMOS switch pair between the negative voltage output and a reference potential. The method further includes coupling first blocking circuitry to the PMOS switch of the first PMOS/NMOS switch pair and to the reference potential, the first blocking circuitry is configured to prevent a charge between the PMOS switch and the NMOS switch of the first PMOS/NMOS switch pair from leaking to the reference potential through the PMOS switch of the first PMOS/NMOS switch pair. The method also includes coupling second blocking circuitry to the PMOS switch of the second PMOS/NMOS switch pair and to the reference potential, the second blocking circuitry is configured to prevent a charge between the PMOS switch and the NMOS switch of the second PMOS/NMOS switch pair from leaking to the reference potential through the PMOS switch of the second PMOS/NMOS switch pair.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:
1. A negative charge pump circuit, comprising:
a first PMOS/NMOS switch pair coupled between a negative voltage output and a reference potential;
a second PMOS/NMOS switch pair coupled between the negative voltage output and a reference potential;
a first capacitor having a positive node coupled to a first clock signal configured to charge the first capacitor and negative node coupled to the first PMOS/NMOS switch pair and to the second PMOS/NMOS switch pair and configured to control the conduction state of the second PMOS/NMOS switch pair;
a second capacitor having a positive node coupled to a second clock signal configured to charge the second capacitor and negative node coupled to the second PMOS/NMOS switch pair and to the first PMOS/NMOS switch pair and configured to control the conduction state of the first PMOS/NMOS switch pair;
first blocking circuitry coupled to the PMOS switch of the first PMOS/NMOS switch pair and to the reference potential, the first blocking circuitry is configured to prevent a charge at said negative node of said first capacitor from leaking to the reference potential through the PMOS switch of the first PMOS/NMOS switch pair; and
second blocking circuitry coupled to the PMOS switch of the second PMOS/NMOS switch pair and to the reference potential, the second blocking circuitry is configured to prevent a charge at said negative node of said second capacitor from leaking to the reference potential through the PMOS switch of the second PMOS/NMOS switch pair.

2. The negative charge pump circuit of claim 1, wherein the first and second clock signals alternate switching between high and low potential states.

3. The negative charge pump circuit of claim 1, wherein when the first clock signal is at a low potential state and the second clock signal is at a high potential state, the charge at the negative node of the second capacitor is transferred to the negative voltage output.

4. The negative charge pump circuit of claim 1, wherein when the first clock signal is at a high potential state and the second clock signal is at a low potential state, the charge at the negative node of the first capacitor is transferred to the negative voltage output.

5. The negative charge pump circuit of claim 1, wherein the first and second blocking circuitry each includes a diode coupled in forward bias between the reference potential and the respective PMOS switch.

6. The negative charge pump circuit of claim 1, wherein the PMOS switches are isolated PMOS devices and each respective blocking circuitry is coupled between an N-well region of each respective isolated PMOS device and the reference potential.

7. The negative charge pump circuit of claim 1, wherein the first blocking circuitry is configured to prevent the charge at the negative node of the first capacitor from leaking to the reference potential through the PMOS switch of the first PMOS/NMOS switch pair when the PMOS switch of the first PMOS/NMOS switch pair is in an OFF or non-conducting state.

8. The negative charge pump circuit of claim 1, wherein the second blocking circuitry is configured to prevent the charge at the negative node of the second capacitor from leaking to the reference potential through the PMOS switch of the second PMOS/NMOS switch pair when the PMOS switch of the second PMOS/NMOS switch pair is in an OFF or non-conducting state.

9. A negative charge pump circuit, comprising:
a first PMOS/NMOS switch pair coupled between a negative voltage output and a reference potential;
a second PMOS/NMOS switch pair coupled between the negative voltage output and a reference potential;
first blocking circuitry coupled to the PMOS switch of the first PMOS/NMOS switch pair and to the reference potential, the first blocking circuitry is configured to prevent a charge between the PMOS switch and the NMOS switch of the first PMOS/NMOS switch pair from leaking to the reference potential through the PMOS switch of the first PMOS/NMOS switch pair; and
second blocking circuitry coupled to the PMOS switch of the second PMOS/NMOS switch pair and to the reference potential, the second blocking circuitry is configured to prevent a charge between the PMOS switch and the NMOS switch of the second PMOS/NMOS switch pair from leaking to the reference potential through the PMOS switch of the second PMOS/NMOS switch pair.

10. The negative charge pump circuit of claim 9, further comprising:
a first capacitor having a positive node coupled to a first clock signal configured to charge the first capacitor and negative node coupled to the first PMOS/NMOS switch pair and to the second PMOS/NMOS switch pair and configured to control the conduction state of the second PMOS/NMOS switch pair; and
a second capacitor having a positive node coupled to a second clock signal configured to charge the second capacitor and negative node coupled to the second PMOS/NMOS switch pair and to the first PMOS/NMOS switch pair and configured to control the conduction state of the first PMOS/NMOS switch pair.

11. The negative charge pump circuit of claim 10, wherein the first and second clock signals alternate switching between high and low potential states.

12. The negative charge pump circuit of claim 10, wherein when the first clock signal is at a low potential state and the second clock signal is at a high potential state, the charge at the negative node of the second capacitor is transferred to the negative voltage output.

13. The negative charge pump circuit of claim 10, wherein when the first clock signal is at a high potential state and the second clock signal is at a low potential state, the charge at the negative node of the first capacitor is transferred to the negative voltage output.

14. The negative charge pump circuit of claim 9, wherein the first and second blocking circuitry each includes a diode coupled in forward bias between the reference potential and the respective PMOS switch.

15. The negative charge pump circuit of claim 9, wherein the PMOS switches are isolated PMOS devices and each respective blocking circuitry is coupled between an N-well region of each respective isolated PMOS device and the reference potential.

16. The negative charge pump circuit of claim 10, wherein the first blocking circuitry is configured to prevent the charge at the negative node of the first capacitor from leaking to the reference potential through the PMOS switch of the first PMOS/NMOS switch pair when the PMOS switch of the first PMOS/NMOS switch pair is in an OFF or non-conducting state.

17. The negative charge pump circuit of claim 10, wherein the second blocking circuitry is configured to prevent the charge at the negative node of the second capacitor from leaking to the reference potential through the PMOS switch of the second PMOS/NMOS switch pair when the PMOS switch of the second PMOS/NMOS switch pair is in an OFF or non-conducting state.

18. A method, comprising:
coupling a first PMOS/NMOS switch pair between a negative voltage output and a reference potential;
coupling a second PMOS/NMOS switch pair between the negative voltage output and a reference potential;
coupling first blocking circuitry to the PMOS switch of the first PMOS/NMOS switch pair and to the reference potential, the first blocking circuitry is configured to prevent a charge between the PMOS switch and the NMOS switch of the first PMOS/NMOS switch pair from leaking to the reference potential through the PMOS switch of the first PMOS/NMOS switch pair; and
coupling second blocking circuitry to the PMOS switch of the second PMOS/NMOS switch pair and to the reference potential, the second blocking circuitry is configured to prevent a charge between the PMOS switch and the NMOS switch of the second PMOS/NMOS switch pair from leaking to the reference potential through the PMOS switch of the second PMOS/NMOS switch pair.

19. The method of claim 18, further comprising:
coupling a first capacitor having a positive node to a first clock signal configured to charge the first capacitor and negative node coupled to the first PMOS/NMOS switch pair and to the second PMOS/NMOS switch pair and configured to control the conduction state of the second PMOS/NMOS switch pair; and coupling a second capacitor having a positive node to a second clock signal configured to charge the second capacitor and negative node coupled to the second PMOS/NMOS switch pair and to the first PMOS/NMOS switch pair and configured to control the conduction state of the first PMOS/NMOS switch pair.

20. The method of claim 19, wherein:

when the first clock signal is at a low potential state and the second clock signal is at a high potential state, the charge at the negative node of the second capacitor is transferred to the negative voltage output; and wherein when the first clock signal is at a high potential state and the second clock signal is at a low potential state, the charge at the negative node of the first capacitor is transferred to the negative voltage output.

* * * * *